June 28, 1938.   L. C. BECKWITH ET AL   2,122,021
METHOD OF AND APPARATUS FOR PROCESSING FIGS
Filed June 8, 1936
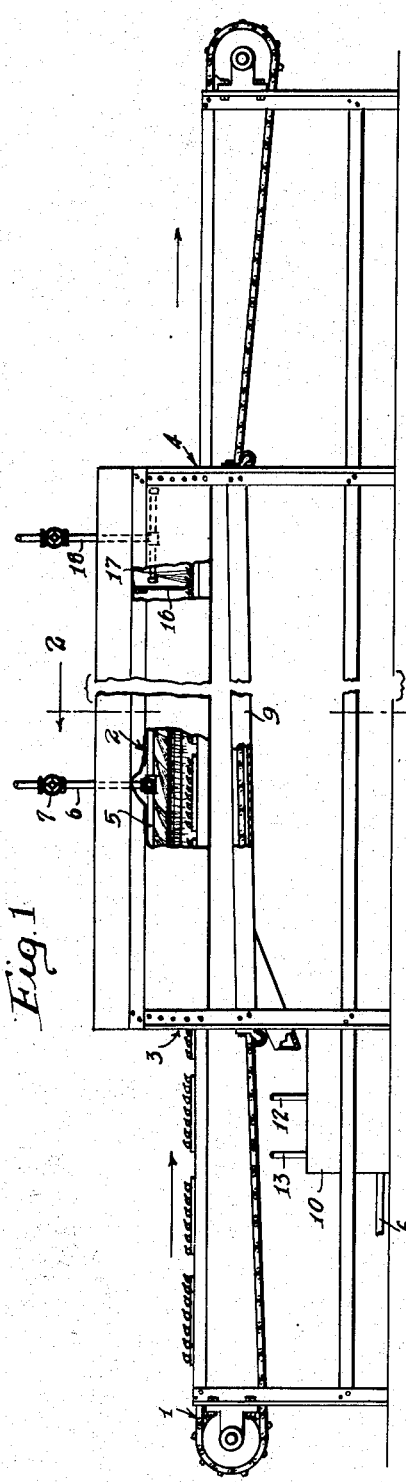
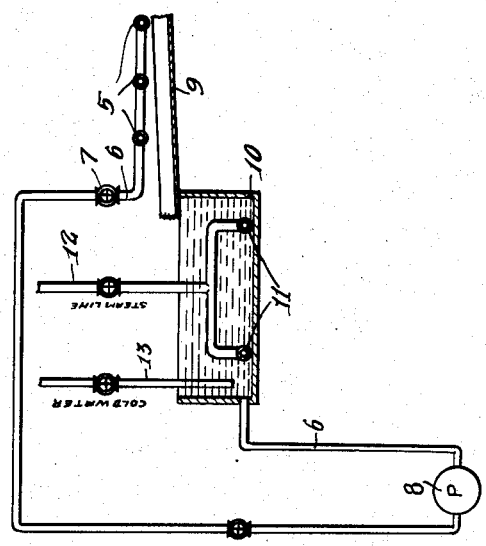
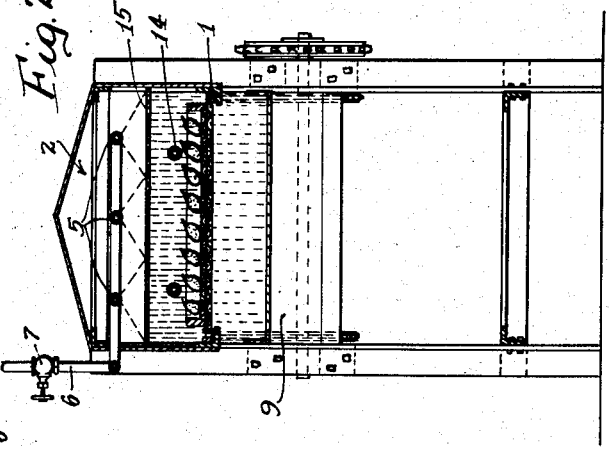
INVENTORS
Leonard C. Beckwith
Richard D. Leuschner
Free Fordham
BY
Lyon&Lyon
ATTORNEYS Patented June 28, 1938

2,122,021

UNITED STATES PATENT OFFICE 2,122,021

METHOD OF AND APPARATUS FOR PROCESSING FIGS

Leonard C. Beckwith, Berkeley, Richard D. Leuschner, Merced, and Free Fordham, Turlock, Calif., assignors to The Bear Creek Company, Merced, Calif., a corporation of California Application June 8, 1936, Serial No. 84,098

12 Claims. (Cl. 99—100)

This invention relates to a method of and apparatus for processing figs, and is more particularly related to a process of "blanching" figs preparatory to canning.

In using the word "blanching" applicants are using this term as directed to the preliminary step of preparing figs for canning wherein, as heretofore practiced, the figs have been subjected either to the action of steam or have been immersed in water heated to temperatures of around the boiling point for the purpose of eliminating from the figs the sap contained in the skins or in the pulpy portion of the figs. This sap, if allowed to remain in the figs as they are canned, gives to the figs a bitter and unpleasant taste.

In preparing figs for canning, efforts have heretofore been made to remove from the figs before canning the sap which gives to the canned figs an unpleasant taste. Figs include natural sugar. This sugar is soluble in water. When too great a quantity of the natural constituent of the figs is removed, the figs collapse, with the result that an unsightly and poor-tasting product is produced. Likewise upon the removal of too great a quantity of the natural sugar of the figs, the product produced has very little taste and is, of course, considerably reduced in food value.

In the process as heretofore utilized for the blanching of the figs, either live steam has been applied directly to the fruit or the fruit has been immersed in water either at boiling temperatures or at temperatures near boiling. In the use of the steam process of blanching, the sap is quickly removed but at the same time the fruit is collapsed to a degree sufficient to cause the fruit juice to flow out of the fruit. The result of immersion of the figs in boiling water is very similar to the action of steam on the figs. The boiling water drenches a considerable portion of the juice from the figs. In either case where boiling water or steam is utilized, a great loss of flavor and of the natural sugar of the figs results.

Other processes have been attempted of blanching the figs wherein a short dipping in boiling water has been resorted to, or the figs have been immersed for a long period of time in water at temperatures considerably below boiling. The result of these modifications of the two processes heretofore described is that the sap carrying the disagreeable odor and taste is not entirely eliminated from the figs, and while there is less removal of sugar and the natural juice of the figs, the removal is such as to reduce the flavor of the product produced.

It is an object of our invention to provide a method of blanching figs which will act to effectively remove the disagreeable constituents from the sap thereof without collapsing the fig or removing a material portion of the sugar or sirup of the figs.

Another object of our invention is to provide a method of blanching the figs wherein the sap containing the disagreeable ingredients is caused to sweat to the exterior surface of the fig and be washed away without removing from the figs the natural sugars or sirups thereof and without collapsing the fruit.

Another object of this invention is to provide an apparatus for processing figs, which apparatus is continuous in operation and includes a fine spray or rain of heated water which is applied to the figs in a chamber as the figs are continuously conveyed through the chamber.

Other objects and advantages of this invention it is believed will be apparent from the following detailed description of a preferred embodiment thereof as illustrated in the accompanying drawing.

In the drawing:

Figure 1 is a side elevation partly in section of the apparatus employed in processing the figs and embodying our invention.

Figure 2 is a sectional view taken substantially on the line 2—2 of Figure 1.

Figure 3 is a diagrammatic view illustrating the recirculation system embodied in our invention.

We have discovered that figs may be processed to remove from the figs the sap or matter which, if allowed to remain in the figs, gives the figs a bitter taste when canned, by subjecting the figs to a finely divided spray of water or a liquid, which water or liquid is at an elevated temperature.

We have discovered that in the subjecting of figs to the action of a finely divided spray of hot water that the figs are caused to "sweat", drawing to the surface the sap or matter having the bitter taste and that the finely divided spray of hot water or liquid washes this matter from the surface of the figs.

We have discovered that by this method the matter which gives to the figs the bitter or unpleasant taste on subsequent canning can be removed without collapsing the figs and without removing from the figs a large or material portion of the juice of the figs or the sugar thereof.

In accordance with the method embodying our invention, the figs after being first graded and cleaned are placed upon trays in a familiar manner well understood and as heretofore practiced in the art. The trays carrying the figs are then placed upon a conveyer which slowly conveys the figs through a chamber.

Within the chamber the figs are subjected to the action of a very finely divided spray of water heated to a temperature of above 170° F. In order to maintain the finely divided spray of water of low pressure at the temperature desired, the water is caused to fall through an exhaust of steam. The spray of water effectively prevents the steam directly contacting the fruit. At this elevated temperature the figs are caused to "sweat" with the result that the sap or matter tending to give the figs the bitter or unpleasant taste passes through the skin to the surface thereof. By this method the figs are softened and the matter drawn to the surface of the figs is washed therefrom by the finely divided spray of hot water. The action is sufficient to remove all of this matter tending to give the figs the unpleasant taste. The action, however, of the finely divided spray of hot water is not sufficient to remove from the figs, or to leach from the figs, the sugar thereof, or the juice of the figs. The result is that the figs are softened to the degree desired and the matter giving the unpleasant taste to the figs is effectively drawn therefrom while there is removed from the figs a minimum quantity of the desired constituents of the figs. Further than the foregoing the figs are not collapsed as is the common result where the figs are subjected to the action of steam or are immersed in boiling water.

The entire blanching done in accordance with our process requires approximately fifteen minutes and the chamber is of sufficient length, and the speed of the conveyer is regulated so that the figs in passing through the chamber are subjected to the action of the low pressure fine spray of hot water for approximately fifteen minutes.

In order to "set" the figs after they have passed through this blanching operation, they are subjected to the further action of a spray of cold water to chill the figs.

It is important in carrying out the process embodying our invention that the finely divided sprays of hot water are sufficient in quantity to maintain the figs in a flowing film of water over each fruit. It is essential likewise that the finely divided spray of water is sufficient to actually intercept the steam and prevent the same from coming into direct contact with the fruit.

In order to carry out the process embodying our invention, we prefer to employ apparatus of the character as illustrated in the accompanying drawing. This apparatus includes a conveyer 1 which is of the wire draper type, and is continuously driven.

The trays carrying the figs are placed upon this conveyer 1. The conveyer passes through a chamber 2, which is preferably an enclosed container having any suitable or desirable form of fabric material gates at its entrance and exit ends 3 and 4. Within the chamber 2 above the conveyer 1 are a plurality of hot water spray pipes 5 which are positioned over the conveyer in such a manner as to provide for substantially equal distribution of the spray. The hot water pipes are fed with hot water from a hot water main 6 controlled by a valve 7. The hot water is supplied to the hot water main 6 from a pump 8 which is driven in any suitable manner. The hot water, after leaving the spray pipes 5 and the spray nozzles thereof, passes into a sump or drain thereof 9, at the bottom of the chamber 2 and drains into a supply tank 10. Steam coils 11 are positioned in the supply tank 10 and are supplied with steam from a steam supply line 12.

In order to provide for evaporation or other loss of water, the fresh water supply line 13 likewise leads into the tank 10. The water is thus continuously heated as supplied to the sprays 5.

As the sprays 5 are under relatively low pressure, it is found inconvenient to endeavor to heat the water in the supply line 10 to a sufficient degree to obtain the desired temperature of the spray of water as it contacts the figs. In order therefore to insure that the water spray as it contacts the figs is of sufficient temperature, steam supply pipes 14 are provided in the chamber 2 to admit live steam into the chamber 2. The live steam pipes are preferably located below the dispersing screen 15, and the flow of water by the steam pipes 14 is sufficient in magnitude to take up all of the steam emitted from the pipe 14 without permitting the steam to directly contact the figs carried upon the conveyer 1.

In order to obtain the desired fine spray of hot water and to obtain the desired distribution of the spray and maintain the spray of water under low temperature, we prefer to employ the intercepting screen 15. This intercepting screen 15 is located below the hot water spray pipes 5 and is preferably a fine mesh copper screen on which the water from the spray pipes 5 collects. The water drops through the fine copper screen 15 in fine drops of low pressure and the drops are very closely associated. The result is that these fine drops are heated by the steam from the steam coils 14 and are evenly distributed over the conveyer 1 and are sufficient in magnitude to maintain a flowing film of water over each individual fig as it is conveyed through the chamber 2.

Mounted at the exit end of the chamber 2 is a dividing curtain 16 which separates the blanching portion of the chamber 2 from the chilling portion thereof. In the chilling portion of the chamber 2 the figs are subjected to the action of cold water for the purpose of chilling the figs. The cold water is supplied through spray pipes 17 from a water main 18.

Having fully described our invention, it is to be understood that we do not wish to be limited to the details herein set forth, but our invention is of the full scope of the appended claims.

We claim:

1. A method of processing figs including the steps of conveying the figs through a finely divided spray of hot water.

2. A method of processing figs which includes the steps of continuously conveying figs through a chamber and spraying hot water onto the figs as they pass through the chamber, and then chilling the figs.

3. A method of processing figs which includes the steps of subjecting figs to the action of a finely divided spray of hot water to cause the sap in the skins of the figs to be drawn to the surface thereof, and simultaneously washing the sap from the figs without collapsing the figs.

4. A method of processing figs which includes the steps of subjecting figs to the action of a finely divided spray of hot water which in reaching the figs passes through a region including steam.

5. A method of processing figs which includes the steps of continuously conveying the figs through a chamber, subjecting the figs to a finely divided spray of hot water under low pressure for a period of approximately fifteen minutes in said chamber, and then chilling the figs.

6. A method of processing figs which includes the steps of conveying figs through a chamber, subjecting the figs while conveyed through the chamber to a continuous spray of finely divided water under low pressure and at a temperature in excess of 170° F. to cause the sap to be drawn to the surface of the figs and to be washed therefrom, and then chilling the figs.

7. An apparatus for processing figs including a chamber, a means for supporting the figs within the chamber, means for spraying hot water upon the figs, a fine mesh screen between the hot water spray and the figs.

8. An apparatus for processing figs including a chamber, means for supporting figs within the chamber, a hot water spray, a fine mesh screen interposed between the hot water spray and the figs, and means for supplying steam in the region between the screen and the figs.

9. An apparatus for processing figs including a chamber, a continuously driven conveyer passing through the chamber having figs supported thereon, means within the chamber to provide a low pressure finely divided spray of hot water over the figs on the conveyer.

10. An apparatus for processing figs including a continuously operating conveyer having figs disposed thereon in a single layer, and means within the chamber for spraying the figs with a finely divided spray of hot water to maintain on the figs as they pass through the chamber a film of hot water.

11. An apparatus for processing figs, including a chamber, means for supporting figs within the chamber, means for spraying hot water onto the figs within the chamber, and means for supplying steam between the figs and the hot water spray means.

12. A method of processing figs which includes the steps of heating the figs by contacting the same with heated water to cause the sap to be drawn to the surface of the skin, washing the sap from the surface, and then peeling the figs.

LEONARD C. BECKWITH.
RICHARD D. LEUSCHNER.
FREE FORDHAM.